April 8, 1969  D. B. SPAULDING ET AL  3,437,926
PULSE RESPONSIVE ELECTRICAL METER CIRCUIT INCLUDING MEANS
FOR PRODUCING PULSES OF PREDETERMINED CURRENT VALUE
Filed April 18, 1966

United States Patent Office 3,437,926
Patented Apr. 8, 1969

3,437,926
PULSE RESPONSIVE ELECTRICAL METER CIRCUIT INCLUDING MEANS FOR PRODUCING PULSES OF PREDETERMINED CURRENT VALUE
David B. Spaulding, Carlisle, and Jeffry A. Wisnia, Newton, Mass., assignors to Comstock & Wescott, Inc., Cambridge, Mass., a corporation of Massachusetts
Filed Apr. 18, 1966, Ser. No. 548,346
Int. Cl. G01r 11/02, 23/02
U.S. Cl. 324—70                            12 Claims

ABSTRACT OF THE DISCLOSURE

A rotor of a vehicle closes a switch with each revolution in either direction and produces input pulses at the rotation rate which are applied through an electronic circuit to the coil of a speedometer. The circuit includes a resistance in series with the coil and carrying the coil current so as to develop a voltage drop proportional to the coil current. The voltage drop is compared by an amplifier with a reference voltage source in the circuit and the difference voltage applied to a pulse output amplifier to cause the amplifier to supply output pulses of constant duration and amplitude.

According to the invention a pulse responsive circuit comprises pulse input terminals, a pulse output amplifier having output terminal means for connection to an external load, a reference source of predetermined voltage, an impedance in series with said output terminal means, and a pulse transmission channel connected between said input terminals and output amplifier including comparison means connected to said source and impedance for producing a control signal of amplitude dependent on the difference between said reference voltage and the voltage drop across said impedance, said output amplifier being responsive to said control signal to produce at said output terminal means a current pulse of predetermined value despite changes in said external load.

For the purpose of illustration a preferred embodiment of the invention is shown in the accompanying drawing in which.

Figure 1:
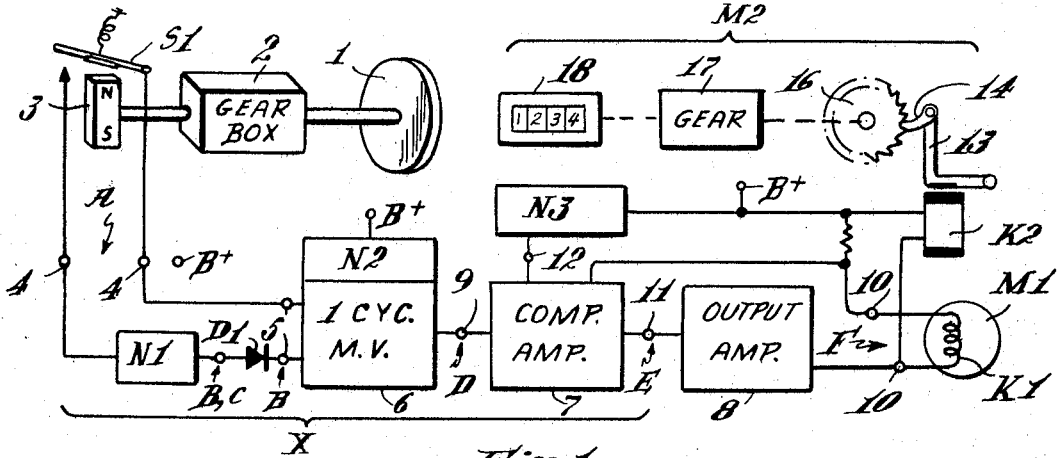
FIG. 1 is a block diagram of a motor vehicle speedometer and odometer system including an electronic pulse responsive circuit.

The motor vehicle meter system shown diagrammatically in FIG. 1 comprises the rotor 1 of the vehicle, for example, a wheel or transmission shaft. The rotor 1 is mechanically connected through a compensating gear box 2 to a rotating permanent magnet 3 disposed adjacent a magnetic reed switch S1. Turning of the rotor 1 causes the magnet 3 to close the switch S1 at a rate proportional to the speed of the rotor. On closing, the switch applies an electrical pulse A from a voltage supply B+ to the input terminals 4 of a pulse transmission channel X in a meter circuit $x$ having output terminals 10 to which a speedometer M1 and an odometer M2 are connected. The pulse transmission X channel comprises a time constant network N1 for differentiating the switch pulse A and producing a relatively short position voltage spike B at the instant $t1$ of the closing of the switch and a negative spike C at the opening of the switch. The positive pulse B only is passed by a diode D1 and applied to the input terminals 5 of a monostable, one-cycle multivibrator 6. For each incoming spike B the multivibrator executes one cycle including a negative going square wave control pulse D beginning at the closing time $t1$ of the switch S1 and ending at a time $t3$ after a duration, $t1$ to $t3$, determined by the time constant network N2, of the multivibrator. The constant duration control pulse D at the output 9 of the multivibrator is applied as a control signal E through an electronic comparison amplifier stage 7 to the input 11 of an output amplifier 8.

The output amplifier conducts current in pulses F through output terminals 10 for a period equal to the duration of the control pulse D. Connected across the output terminals 10 is a load comprising the coil K1 of a speedometer M1 and the coil K2 of a pulse frequency measuring odometer M2.

The odometer M2 comprises the solenoid coil K2 which attracts an armature 13 carrying a pawl 14. Each attraction of the armature causes the pawl to step a toothed wheel 16 connected through a step-down gear chain 17 to a counter 18 calibrated in miles. For a given number of current pulses F applied to the odometer coil K2 the counter 18 will add one digit. This digit will be added irrespective of the direction in which the vehicle rotor is turning, for the reason that the reed switch S1 will initiate a current pulse upon rotation of the permanent magnet 3 either clockwise or counterclockwise. Thus not only may the odometer be driven by the current pulses at the same output terminals 10 to which the speedometer M1 is connected, but also it is particularly useful in construction vehicles, such as bulldozers, whose total mileage forward and backward is significant in scheduling maintenance.

The speedometer M1 comprises an ammeter with a coil movement of long response time with respect to the duration of the current pulses F, so that the speedometer integrates the series of pulse currents and indicates a time integrated value dependent on the predetermined pulse duration, the current amplitude of the pulses, and their frequency. The frequency of the pulses is proportional to the rotational speed of the vehicle rotor, one of the variables to be measured. But the amplitude of the current pulses would normally fluctuate with changes in the B+ supply voltage for the transmission channel, environmental or resistance heating of the speedometer coil K1 or the odometer coil K2, and other variations in the components of the system. And since the accuracy of indication of the speedometer and odometer is governed by magnetic flux of their coils, which is dependent on current rather than voltage, it is important that the pulse current amplitude be independent of extraneous variations.

Such extraneous variations are compensated by the amplifier stage 7 which compares the IR drop across a resistor or equivalent impedance R11 with a reference source N3 of predetermined voltage Vr appearing at the primary input 12 to the comparison amplifier 7. The IR (voltage) drop across the impedance R11, with respect to the same voltage supply B+ as for the constant voltage source N3, is applied to a secondary input 10 to the comparison amplifier 7. The amplifier 7 modulates the amplitude of the control pulses received from the multivibrator 6 dependently on the difference between the predetermined voltage Vr of the reference source N3 at the primary input 9 and the IR of impedance R11 drop appearing at the secondary input 10. Thus variations of the current through the output terminals 10, due to extraneous conditions, are fed back through a servo loop comprising the comparison amplifier 7, the output amplifier 8, and the output terminals 10, so as to compensate for fluctuation of the output current and cause the output amplifier to conduct current pulses of constant and predetermined amplitude.

Figure 2:
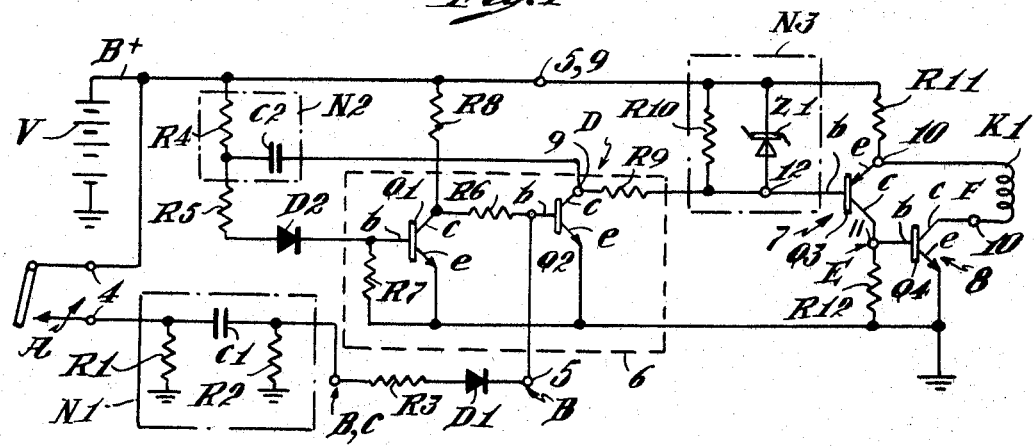
FIG. 2 is a schematic diagram of the electronic circuit.
Figure 3:
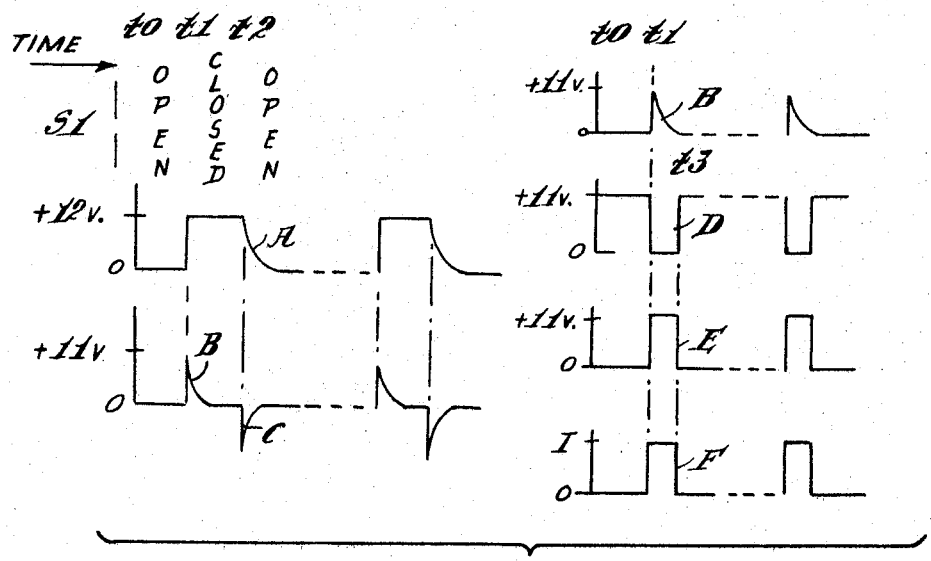
FIG. 3 is a graph of the voltage and current waveforms of the circuit.

A circuit particularly well suited for the above described system is shown schematically in FIG. 2. Typical values and types of components in the circuit are given in the following table:

| | | |
|---|---|---|
| R1 | kilohms | 1 |
| R2 | megohms | 1 |
| R3 | kilohms | 2.2 |
| R4 | do | 150 |
| R5 | do | 33 |
| R6 | do | 1 |
| R7 | do | 100 |
| R8 | do | 12 |
| R9 | ohms | 560 |
| R10 | kilohms | 2.7 |
| R11 | ohms | 12 |
| R12 | kilohms | 10 |
| C1 | microfarads | 0.001 |
| C2 | do | 0.2 |
| D1 | | 1N4154 |
| D2 | | 1N4154 |
| Z1 | | 6U Zener |
| Q1 | | 2N929 |
| Q2 | | 2N929 |
| Q3 | | 2N3633 |
| Q4 | | 2N656 |

In FIG. 2 the magnetic reed switch pulses A are differentiated by a resistance-capacitance network N1 comprising resistors R1 and R2 and a storage capacitor C1 having a decay time constant much shorter than the interval $t1$ to $t2$ during which the switch S1 is closed. When the reed switch S1 is open the capacitor C1 is discharged through resistors R1 and R2. Closing the reed switch immediately pulls one side of the storage capacitor to B+ and generates the resultant positive spike B. The positive spike B is formed by the network N1 and passes through diode D1. It appears at a terminal 5, and is applied to the base $b$ of a first transistor Q2 which is cross coupled with a second transistor Q1 of the multivibrator MV. The base $b$ of the second transistor Q1 is biased for normal conduction by a voltage divider comprising resistors R4, R5 and R7. Conduction of transistor Q1 normally holds transistor Q2 cut off. However when a positive spike B is applied to the base $b$ of transistor Q2, transistor Q2 will conduct and apply a negative pulse through a capacitor C2, resistor R5 and a diode D2 to the base $b$ of transistor Q1, cutting off transistor Q1 for a period determined primarily by the time constant (about 0.01 seconds) of the network N2 comprising resistor R4 and capacitor C2. Terminal 9 at the collector $c$ of transistor Q2 carries the constant duration, negative going square wave voltage pulse D.

The square pulse D is applied through a coupling resistor R9 to a terminal 12 at the base $b$ of a transistor stage Q3 comprising the comparison amplifier 7. This PNP type transistor Q3 is normally cut off by positive bias with its collector $c$ near ground voltage which, connected through an input terminal 12 at the base $b$ of an output amplifier transistor Q4, holds the transistor Q4 below cut off. When a negative multivibrator control pulse is applied to the base $b$ of the comparison transistor Q3, this transistor conducts and its collector $c$ voltage drops toward ground potential for the predetermined duration, $t2$ to $t3$, of the multivibrator control pulse D. Thereby a control signal E of the same polarity and pulse duration is applied to the base of transistor Q4, an NPN type, causing transistor Q4 to conduct current in pulses F.

The pulsed output current F flows through the coil K1 of the speedometer M1, and the coil K2 of the odometer M2, if the latter is used, and also through the sensing resistor R11 connected between the B+ supply and one of the output terminals 10. Thus the IR drop across the sensing resistor R11 reflects current variations at terminal 10, which is connected to the emitter $e$ of the comparison amplifier Q3. The emitter $e$ is a secondary input to amplifier Q3, the primary input being its base $b$. The base $b$ is connected to a common junction 12 of a Zener or like breakdown diode Z1 and a resistor R10, both connected to the same B+ supply as the sensing resistor R11. The diode Z1 provides a predetermined reference voltage at the junction 12, the primary input to the comparison amplifier Q3. The voltage difference between the output terminal 10 and the common junction 12 provides a variable bias for the comparison transistor Q3 dependent on current through the output terminal. If the current varies from a predetermined value, the voltage at terminal 10 and the bias vary accordingly and correct the current gain (beta) of transistor Q3 to restore the amplitude of its control signal E and of the current pulses F to predetermined value.

With the duration and amplitude of the current pulses F fixed at predetermined values the integrated value of the current pulses is dependent only on their frequency. The integrated current value is therefore independent of changes in the resistance of the meter coils K1 and K2, due to temperature changes in the gain (beta) of transistors Q3 and Q4, and in the voltage supply B+. The comparison circuit is thus unlike a conventional voltage regulator which would allow current variations.

Variations in the amplitude, duration and shape of the reed switch pulses A are eliminated by differentiating and rectifying these pulses and using them to trigger multivibrator pulses D dependent only in frequency on the switch pulses. Thus the reed switch S1 and magnet 3 may be located remotely from the meters and meter circuit and connected only electrically.

Further the meter circuit ignores the steady state condition of its input and responds only to changes. For example, if the vehicle metered were to stop with its rotor holding the reed switch S1 closed, the storage capacitor C1 of the differentiating network N1 would transmit one final spike B and then remain discharged, unable to transmit further pulses and imposing no drain on the battery V.

From the foregoing description it is apparent that the present invention affords a reliable pulse responsive circuit, with low power requirements and high accuracy independent of circuit and external changes, and which is particularly advantageous when used in combination with a motor vehicle speedometer or odometer.

We claim:

1. A pulse rate metering circuit comprising pulse input terminals, a pulse output amplifier having output terminal means, a reference source of predetermined voltage, an impedance in series with said output terminal means, a pulse transmission channel connected between said input terminals and output amplifier including comparison means connected to said source and impedance for producing a control signal of amplitude dependent on the difference between said reference voltage and the voltage drop across said impedance, said output amplifier being responsive to said control signal to produce at said output terminal means a current pulse of predetermined value despite changes in the external load thereof and a pulse measuring means connected to said output terminal means to provide an indication of the pulse output of said amplifier.

2. A circuit according to claim 1 wherein said comparison means comprises electronic valve means having input means connected to said reference source and impedance respectively, and output means connected to said pulse output amplifier to apply said control signal thereto, said output amplifier producing a current pulse dependent in amplitude on the amplitude of said control signal.

3. A circuit according to claim 2 wherein said voltage reference source comprises voltage supply, a first resistor and a breakdown diode connected in parallel between said supply and a first of said valve input means, said impedance comprising a second resistor connected between said supply and a second of said valve input means.

4. A circuit according to claim 2 wherein said valve means, output amplifier and output terminal means comprises a servo loop.

5. A circuit according to claim 1 wherein said measuring means is a pulse averaging meter.

6. A circuit according to claim 5 in combination with a pulse counting means connected to said output terminal means.

7. A circuit according to claim 1 wherein said pulse measuring means is a pulse counting means.

8. A circuit according to claim 1 wherein said pulse transmission channel comprises monostable relay means connected between said pulse input terminals and comparison for producing a control pulse of predetermined duration in response to each pulse at said input terminals, thereby to cause said comparison means to produce a control signal of said predetermined duration and to cause said output amplifier to produce a current pulse of predetermined duration and value.

9. A circuit according to claim 8 wherein said relay means comprises a one cycle multivibrator including time constant means establishing said predetermined duration of said control pulse.

10. A circuit according to claim 8 wherein said channel comprises a pulse input network connected between said input terminals and relay means including a differentiating network for producing a trigger pulse of short duration in response to each input pulse of any greater duration.

11. A circuit according to claim 10 in combination with a pulse rectifier connected between said differentiating network and said relay means.

12. A meter system for a mobile vehicle having a rotor (1) comprising:
   means (S1, 3) for sensing rotation of said rotor in either direction including means (3) for generating a series of electric pulses (A) at a rate proportional to the rate of rotation of said rotor,
   a pulse input network (4, N1) connected to said sensing means including a time constant network (N1) for differentiating each of said pulses to produce a trigger pulse (B) of short duration in response to each input pulse (A) of any greater duration,
   a rectifier (D1) connected to said network for passing trigger pulses (C) of a predetermined polarity,
   a monostable, one-cycle multivibrator (MV) having an input (b of Q2) connected to said rectifier and including time constant means (N2), said multivibrator being responsive to a rectified trigger pulse (C) to produce a control pulse (D) of duration (t1–t3) predetermined by said time constant means,
   a pulse output amplifier (8) including first electronic valve means (Q4) having input means (11) and output means (10),
   a pulse integrating current meter comprising a speedometer (M1) with a load coil (K1) connected to said output terminal means (10),
   a pulse counting meter comprising an odometer (M2) with a load coil (K2) connected to the same said output terminal means,
   a reference source including a voltage supply (B+), a first resistor (R10), a diode (Z1) having a breakdown characteristic at a predetermined voltage (Vr) and a common junction (11) at which said constant voltage appears,
   a second resistance (R11) of substantially lower ohmic value than said first resistance connected in series with said output amplifier terminal means at a second junction (10), and
   a comparison amplifier (7) including second electronic valve means (Q3) having two cooperative input means (b and e) and output means (c), one of said input means being connected to said monostable multivibrator (MV) and being responsive to the control pulse (D) therefrom to produce a control signal (E) of substantially the same predetermined duration as said control pulse, said comparison amplifier input means being connected respectively to said common junction (12) and said second junction (10) so as to vary the amplitude of said control signal (E) dependently on the difference between said predetermined voltage (Vr) and the voltage drop across said second resistance and said meters, and said second voltage output means (c of Q3) being connected to the input terminal (b) of said first electronic valve (Q4) to apply said control signal thereto,
   said output amplifier (Q4) being responsive to said control signal to produce at said output terminal means a series of current pulses (F) of predetermined duration and amplitude despite changes in the load of said meters, whereby said speedometer (M1) indicates the instantaneous integrated current value of a series of said pulses, and said odometer (M2) registers the sum of rotations of said vehicle rotor (1) in either direction.

References Cited

UNITED STATES PATENTS

| | | | |
|---|---|---|---|
| 2,295,118 | 9/1942 | Le Clair | 324—70 |
| 2,999,168 | 9/1961 | Henry | 324—70 |
| 3,222,550 | 12/1965 | Willard | 307—237 |
| 3,293,505 | 12/1966 | Miller | 323—4 |
| 3,346,810 | 10/1967 | Littman | 324—70 |
| 3,348,143 | 10/1967 | Young | 324—70 |

RUDOLPH V. ROLINEC, *Primary Examiner.*

M. J. LYNCH, *Assistant Examiner.*

U.S. Cl. X.R.

324—78